United States Patent Office 3,108,992
Patented Oct. 29, 1963

3,108,992
METHOD FOR MAKING A POLYMER OF N-(VI-NYLBENZYL)-N-(HYDROXYETHYL) AMINE
Carl Moore and William F. Tousignant, Midland, Mich., assignors to The Dow Chemical Company, Midland, Mich., a corporation of Delaware
No Drawing. Filed June 2, 1961, Ser. No. 114,307
1 Claim. (Cl. 260—88.1)

This invention concerns a method for making water-insoluble polymeric N-(vinylbenzyl)-N-(hydroxyethyl) amine resins, hereafter referred to as PVBHEA resins.

It is known to prepare nitrogenous anion exchange resins by reacting a chloromethylated copolymer of a mixture of a predominant amount of monovinylaryl monomer and a minor amount of a crosslinking agent containing two non-conjugated vinylidene groups, with an amine containing two hydrogen atoms attached to the amine nitrogen atom. The reaction yields a polymeric amine salt. Such reactant primary amines, since they have two reactive hydrogen atoms, also can and do react to an appreciable extent in the proportion of two moles of chloromethylated polymer per mole of primary amine to form crosslinks at the amino nitrogen atoms. This side reaction in the conventional preparation of polyamine anion exchange resins causes a substantial reduction in resin capacity and in rate of anion uptake.

It has now been discovered that water-insoluble PVBHEA resins can be prepared by reacting in aqueous, alcoholic or aqueous alcoholic media at least an equimolar proportion of a strong base and up to 10% excess thereof, 2-oxazolidinone group basis, with the resinous polymer prepared by reacting an alkali metal salt of 2-oxazolidinone or of its 4- and/or 5-position-substituted 1 to 4 carbon alkyl or 6 to 10 carbon monoaryl derivatives, e.g., 5-methyl-2-oxazolidinone. 5-ethyl-2-oxazolidinone, 5-phenyl-2-oxazolidinone, with a chloromethylated vinylaryl polymer having 0.75 to 1.5 chloromethyl groups per available aryl nucleus, crosslinked with between 0.9 and 5 mole percent, vinylaryl polymer basis, of a crosslinking agent having two non-conjugated vinylidene groups, e.g., divinylbenzene, divinyltoluene, divinylxylene, divinylethylbenzene, divinylnaphthalene, diacrylate esters, dimethacrylate esters, diallyl esters, etc. Thereby a N-hydroxyethylamine-substituted resin is obtained. The reactant oxazolidinone resin polymer used in this reaction and its method of preparation are described in copending application Serial No. 177,250, filed March 5, 1962, which is a continuation-in-part of application Serial No. 114,302, filed June 2, 1961, now abandoned.

The reaction schematically is as follows:

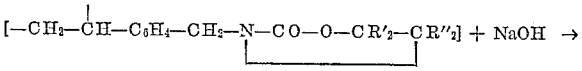

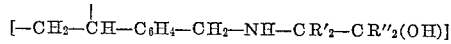

wherein the first reactant represents a polymeric 3-(ar-vinylbenzyl)-2-oxazolidinone (hereafter PAVBO) and each R' and R" group individually is one of hydrogen and 1 to 4 carbon alkyl and 6 to 10 carbon aryl groups, no more than one of which is aryl.

By a strong base is meant an alkali metal, ammonium or quarternary ammonium hydroxide or an alkaline earth oxide or hydroxide.

The reaction medium utilized in the process of this invention is water, monohydric or polyhydric alcohols which are liquid at 20° C. and have a boiling point up to 200° C. or aqueous solutions containing at least 10 weight percent of said monohydric or polyhydric alcohols.

In practice, the PAVBO resin reactant is heated with at least an equimolar proportion and up to 10% excess, 3-(ar-vinylbenzyl)-2-oxazolidinone basis, of a strong base dissolved in water, liquid monohydric or polyhydric alcohol, or an aqueous solution of either of said alcohols, in amount sufficient to provide a fluid, stirrable mixture. The reaction mixture is maintained at a temperature between 40° C. and the boiling point of the liquid solvent, but not in excess of the softening point of the PAVBO beads, i.e., not above about 150° C., for time sufficient to develop at least ca. 50% of maximum basicity and up to maximum basicity, ca. 5 milliequivalents of acid capacity per gram of lightly crosslinked (ca. 1%) dry resin beads. The reacted beads are filtered off, washed with water and with dilute acid, advantageously mineral or acetic acid, the acid is neutralized with dilute base and the product resin beads are then finally rinsed free of salts with water. The degree of conversion of the reactant PAVBO resin beads is determined by periodic testing of a washed and neutralized sample by immersion in 100 ml. of standardized 0.1 normal hydrochloric acid for 63 hours and titration of an aliquot portion of the acid with 0.1 normal sodium hydroxide. Superatmospheric pressure is used when higher reaction temperatures are desired, particularly when the more volatile alcohols are being used. The higher the temperature, the shorter the reaction time for converting the oxazolidinone resin beads to polyamine resin beads. At the boiling point in 0.5 normal aqueous sodium hydroxide, conversion above 80% of reactant oxazolidinone resin beads is attained in 30 hours, depending upon the degree of crosslinking of reactant resin.

The resinous products of this invention have the ability to sequester acids and anions.

The following examples describe completely specific embodiments and the best mode of operation of the process invented.

Example 1

A 260 gram sample of water-wet polymeric 3-(ar-vinylbenzyl)-5-methyl-2-oxazolidinone resin beads (1% combined divinylbenzene content), 166 grams dry weight, was charged to a 2-liter resin flask fitted with stirrer, condenser, and thermometer. To the flask was also added 1200 ml. of aqueous 50% ethanol containing 120 grams of KOH. The mixture was kept at the boiling point of the liquid for 20 hours with stirring at a moderate speed. The reacted beads were then suction filtered on a sintered glass funnel, washed with 3 liters of water, then with 2 liters of 0.1 normal acetic acid, and finally neutralized with 0.1 normal sodium hydroxide and thoroughly water washed to remove salts.

To determine the degree of conversion, a product sample of known weight, 2.29 grams, was immersed in 100 ml. of standardized 0.1 normal hydrochloric acid for 63 hours, then an aliquot portion of the acid was titrated with 0.1 normal sodium hydroxide to determine loss of acidity. The above treatment and analysis gave an acid capacity of 2.94 milliequivalents/gram of dry beads.

The starting material consisted of 50–100 mesh resin beads, a reaction product of 3-sodio-5-methyl-2-oxazolidinone and chloromethylated copolymer of styrene and 1% divinylbenzene.

Substantially similar results are obtained with the corresponding 2-oxazolidinone and alkyl and aryl-2-oxazolidinone-substituted resin reactants.

Example 2

A 14.4 gram dry sample of polymeric 3-(ar-vinylbenzyl)-5-methyl-2-oxazolidinone resin beads (4% combined divinylbenzene content), was charged to a resin flask fitted with stirrer, condenser and thermometer. To the flask was also added 140 ml. aqueous 50% ethanol and 12.3 grams of KOH. The mixture was heated at 82° C. for 40 hours with stirring at a moderate speed. The reacted resin beads were thoroughly water washed, filtered off, reslurried with water, filtered, water washed again, and dried in a vacuum oven at 70° C. for 3 hours. A quantity of 0.6520 gram of dried product beads was soaked in 50 ml. of 0.1 normal hydrochloric acid for 63 hours, then an aliquot of the acid was titrated with 0.1 normal sodium hydroxide to determine loss of acidity. The above treatment and analysis gave an acid capacity of 2.22 meq./gram, dry resin basis.

What is claimed is:

Method for making a water-insoluble, resinous, polymeric N-(vinylbenzyl)-N-(hydroxyethyl)amine resin by reacting substantially equivalent proportions of a resinous copolymer of a 3-(ar-vinylbenzyl)-2-oxazolidinone with between about 0.9 and 5 mole percent, polymer basis, of a crosslinking agent having two non-conjugated vinylidene groups, and a strong base, at a temperature between about 40° C. and 150° C. for a time sufficient to develop at least about 50% of maximum basicity and up to maximum basicity, the 2-oxazolidinone moiety being that of a member of the group consisting of 2-oxazolidinone and of its 4- and 5-position-substituted 1 to 4 carbon alkyl and 6 to 10 carbon monoaryl derivatives.

References Cited in the file of this patent

UNITED STATES PATENTS 2,484,423     Reynolds et al. _____ Oct. 11, 1949